(12) United States Patent
Bernstein et al.

(10) Patent No.: US 11,089,386 B1
(45) Date of Patent: Aug. 10, 2021

(54) ACCOMMODATING IRREGULAR TIMING INFORMATION IN STREAMED MEDIA DATA

(71) Applicant: Amazon Technologies, Inc., Seattle, WA (US)

(72) Inventors: Ryan Bernstein, Portland, OR (US); Ryan Hegar, Happy Valley, OR (US); Timur Darren Kiykioglu, Portland, OR (US); David Montgomery, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/457,862

(22) Filed: Jun. 28, 2019

(51) Int. Cl.
*H04N 21/8547* (2011.01)
*H04N 19/172* (2014.01)
*H04N 21/218* (2011.01)

(52) U.S. Cl.
CPC ....... *H04N 21/8547* (2013.01); *H04N 19/172* (2014.11); *H04N 21/218* (2013.01)

(58) Field of Classification Search
CPC .... H04H 60/37; H04H 60/40; H04L 65/4084; H04L 65/602; H04L 65/607; H04N 19/117; H04N 19/176; H04N 19/65; H04N 21/222; H04N 21/23106; H04N 21/234309; H04N 21/23892; H04N 21/2405; H04N 21/8547; H04N 19/172; H04N 21/218
See application file for complete search history.

(56) References Cited

U.S. PATENT DOCUMENTS 9,344,748 B2 * 5/2016 Lam .................... H04N 21/8456

* cited by examiner

*Primary Examiner* — Omar S Parra
(74) *Attorney, Agent, or Firm* — Nicholson De Vos Webster & Elliott, LLP (57) ABSTRACT

Techniques for accommodating irregular timing information in streamed media data are described. According to some embodiments, at least a portion of a media stream that includes a video component is received, the video component including a plurality of video frames and video timing data, and wherein the media stream includes an indication of a video frame rate. A first duration of a first video frame of the plurality of video frames is determined to be different than an expected video frame duration, wherein the expected video frame duration is based at least in part on the indication of the video frame rate. A timestamp of at least one video frame of the plurality of video frames is adjusted to change the first duration.

20 Claims, 6 Drawing Sheets

ACCOMMODATING IRREGULAR TIMING INFORMATION IN STREAMED MEDIA DATA

BACKGROUND

Various protocols exist for streaming live or pre-recorded media over Internet Protocol (IP)-based networks such as the internet. Exemplary protocols include Real-time Transport Protocol (RTP), Real-Time Message Protocol (RTMP), Dynamic Adaptive Streaming over HTTP (DASH), and HTTP Live Streaming (HLS). One common aspect of each of these protocols is the conveyance of timing information to allow the recipient of the stream to correctly process the various stream components such as audio, video, captions, etc. both individually and together. For example, using the timing information, the recipient can determine when and how long to display a particular video frame relative to other video frames. The recipient can also determine which audio data is to be rendered during the display of a given video frame so that the various components remain synchronized.

BRIEF DESCRIPTION OF DRAWINGS

Various embodiments in accordance with the present disclosure will be described with reference to the following drawings.

DETAILED DESCRIPTION

The present disclosure relates to methods, apparatus, systems, and non-transitory computer-readable storage media for accommodating irregular timing information in streamed media data. Typically, streaming protocols deliver stream components such that they can be processed at a given rate. Such a rate is often advertised to the recipient as part of metadata associated with the stream, such as in header information that can apply globally to the stream or some portion thereof. For example, a stream might include metadata indicating the stream includes a 30 frame-per-second (fps) video component (e.g., each video frame spans ~33 milliseconds) and a 40 fps audio component (e.g., each audio frame contains ~25 milliseconds of audio). Thus, the recipient can expect to receive timing information indicating that video frames are to be processed at 33 millisecond (ms) intervals and have 33 ms durations and that audio frames are to be processed at 40 ms intervals and have 40 ms durations.

Some streaming sources, however, may send timing information that deviates from a recipient's expectation under certain scenarios. One common source of such irregular timing information is mobile devices. Mobile devices, such as laptops, tablets, smartphones, and the like, often share a finite amount of compute capacity across a range of computing tasks which include capturing, compressing, and transmitting streaming media. Other computing tasks can cause the streaming task to wait for access to a shared resource, resulting in generating and sending irregular timing information. Regardless of the source, irregular timing information presents difficulties for a recipient when it comes to processing the stream. What should the recipient do when it receives a frame with a duration of 1 ms despite an advertised frame rate of 60 fps? Absent techniques for handling such irregular timing information, recipients often stitch together non-consecutive frames or insert duplicate frames or blanking periods that can result in undesirable audio or video artifacts. For example, the recipient might duplicate a single video frame for multiple frame durations resulting in a stutter in the rendered video. Similarly, the recipient might skip an audio frame resulting in audible pops or clicks in the rendered audio.

To address these and other problems, various approaches disclosed herein allow a streaming media recipient to reduce the impact of irregular timing data on viewers. According to some embodiments, a timing manager uses the irregular timing data to adjust how the streamed media is processed, deviating from the advertised rate. The timing manager can adjust the expected timestamps of future video and/or audio frames based on the irregular timing data rather than on advertised rate(s). According to some embodiments, the timing manager modifies the irregular timing data to provide a more regular cadence relative to the advertised rate. The timing manager can adjust the durations and/or timestamps of frames to more evenly space frames based on an advertised rate. According to some embodiments, the timing manager adjusts one or more parameters that govern how the different stream components are synchronized. The timing manager permits the stream components to drift further out of sync when irregular timing data is received than would otherwise be permitted when regular timing data is received.

The aforementioned approaches can be implemented anywhere from within a cloud-based service that receives, processes, and distributes media streams to downstream viewers to a computer system that both receives the stream and renders it locally to a viewer. Such approaches can be implemented alone or in various combinations as each contributes to the reduction in undesirable artifacts typically associated with irregular timing information.

Figure 1:
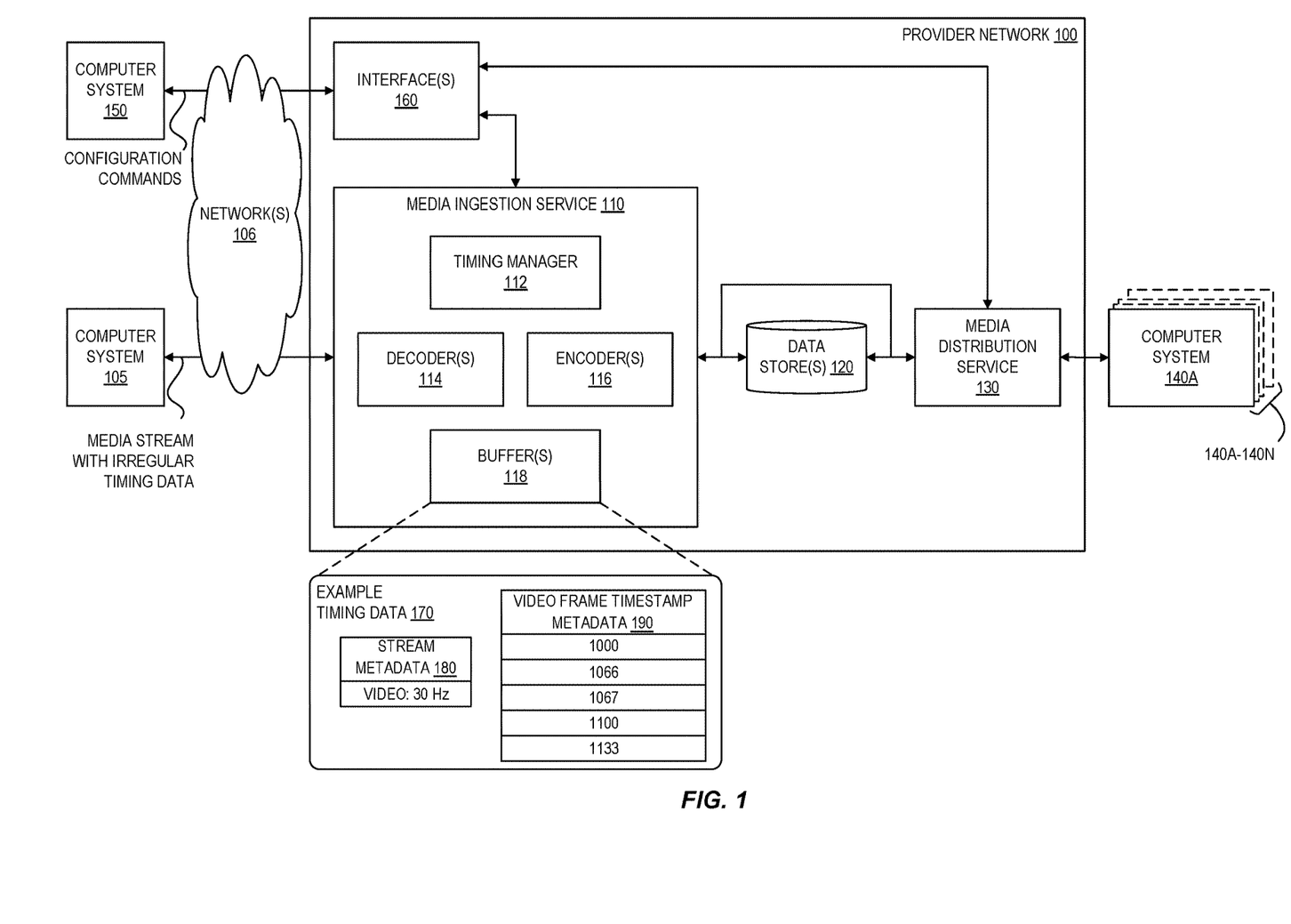
FIG. 1 is a diagram illustrating an exemplary environment for processing streaming media transmissions according to some embodiments.

FIG. 1 is a diagram illustrating an exemplary environment for processing streaming media transmissions according to some embodiments. A provider network 100 provides users with the ability to utilize one or more of a variety of types of computing-related resources and/or services. In the illustrated environment, the provider network 100 that includes a media ingestion service 110 and a media distribution service 130. The media ingestion service 110, the media distribution service 130, and the other illustrated components of the provider network 100 can be implemented as software, hardware, or a combination of hardware and software. For example, the components of the provider network 100 can be implemented as software programs (e.g., instructions or code) executed by one or more computer system of the provider network 100.

Users can interact with the provider network 100 across one or more intermediate networks 106 (e.g., the internet)

via one or more interface(s) 160, such as through use of application programming interface (API) calls, via a console implemented as a website or application, etc. The interface(s) 160 may be part of, or serve as a front-end to, a control plane of the provider network 100 that includes "backend" services supporting and enabling the services offered to customers such as the media ingestion service 110 and/or media distribution service 130. For example, a user can issue one or more commands via a computer system 150 and the interface(s) 160 to set up a portion of the computing resources of the provider network 100 to ingest and distribute a media stream. Further, the user can issue one or more commands to the interface(s) 160 to send messages to the other components of the provider network to enable and/or disable the various approaches for handling media streams with irregular timing data as well as specify any available configuration parameters (e.g., thresholds, tolerances, window sizes, and other parameters as described herein). Note that the user that configures the provider network to ingest and distribute media from a given source may be different than the user providing the source.

The media ingestion service 110 receives a media stream with irregular timing data from a computer system 105 via one or more networks 106 (e.g., the internet). The media ingestion service 110 can receive media streams from a variety of sources via various protocols such as Real-time Transport Protocol (RTP), Real-Time Message Protocol (RTMP), Dynamic Adaptive Streaming over HTTP (DASH), and HTTP Live Streaming (HLS). The media ingestion service 110 can further decode and encode the received media streams into different media formats (e.g., changing the form of compression used on the video and/or audio) and prepare the media for distribution using one or more protocols that may be different than the protocol via which the media stream was originally received. After processing the received stream, the media ingestion service 110 can send the resulting processed stream(s) to one or more data stores 120 for later retrieval or directly to the media distribution service 130.

The media distribution service 130 can stream or send the output of the media ingestion service 110 to one or more computer systems 140A-140N that render the media to viewers. The media distribution service 130 can be a content delivery network with multiple, geographically dispersed locations to facilitate the timely delivery of media data to users (and, in the case of streaming media to users, reduce the network distance to reduce the likelihood of transmission problems).

As illustrated, the media ingestion service 110 includes a timing manager 112, one or more decoders 114, one or more encoders 116, and one or more buffers 118. The media ingestion service 110 receives the media stream from the computer system 105. The media stream can include one or more components (e.g., audio, video, captions, etc.). The decoders 114 can decode stream components from a compressed format such (e.g., H.264 or AAC) to an uncompressed format. The encoders can encode the uncompressed format into a compressed format. Note that in this embodiment, the media ingestion service 110 is performing transcoding operations. In other embodiments, the encoders 116 may be omitted, such as in the case where the timing manager 112, decoders 114, and buffers 118 are implemented as part of a streaming media client executed by a computer system that receives and renders a media stream locally to a viewer.

The media stream further includes metadata that includes timing information to allow the recipient to correctly process the various stream components both individually and together (i.e., keeping multiple components in sync, when present). As used herein, the term "frame" refers to a portion of one of the media components. In the case of video, a frame can correspond to a single frame of a video that is to be rendered to a viewer at some time and for some duration associated with a frame rate, while in the case of audio, a frame can correspond to one or more audio samples to be rendered to a viewer at some time and for a duration associated with a sample rate. The media stream includes (either explicitly or implicitly) metadata for each frame that governs playback timing. Such metadata can include frame timestamps or frame durations. Note that timestamps can be used to calculate durations (e.g., the difference between consecutive timestamps) and durations can be used to calculate timestamps (e.g., the sum of preceding durations in a sequence of frames).

Example timing data 170 includes both stream metadata 180 and video frame timestamp metadata 190 that are received or derived from timing information transmitted with the stream. Stream metadata 180 includes a frame rate for components of the stream illustrated here as a 30 fps (or Hz) video component. Accordingly, the recipient should expect video frames with timestamps approximately 33 ms apart. That is not the case when the stream provides irregular timing data as illustrated by the video frame timestamp metadata 190. As shown, a sequence of frames having associated timestamp of 1000, 1066, 1067, 1100, and 1133, indicating the first frame has a duration of 66 ms (1000 to 1066), the second frame has a durations of 1 ms (from 1066 to 1067), and the third and fourth frames have durations of 33 ms (from 1067 to 1100 and from 1100 to 1133, respectively). Audio frame timestamps can have similar irregularities relative to their advertised frame rate.

For regular timing data, the media ingestion service 110 can feed the decoder 114 and/or the encoder 116 from a buffer based on the advertised frame rate. For example, if the initial timestamp is 1000 with 30 fps video, the media ingestion service 110 can process (with the decoder 114 or encoder 116) a frame with a timestamp of 1000 (plus or minus some tolerance) first, then a frame with a timestamp of ~1033, then a frame with a timestamp of ~1066. This monotonically increasing expected timestamp is based on the advertised frame rate. The media ingestion service 110 can use the expected timestamp to identify the next frame for processing (e.g., decoding, encoding, rendering, etc.). If the expected timestamp is greater than a buffered frame's actual timestamp given the tolerance, the media ingestion service 110 can treat the frame as old and discard the frame. Conversely, if the expected timestamp is less than any buffered frame's actual timestamp given the tolerance, the media ingestion service 110 can cause a prior frame to be duplicated (e.g., in the case where a frame may have been dropped). Finally, if the buffer does not contain a frame within the expected tolerance, the media ingestion service 110 can feed the next frame in the buffer to the decoder or encoder and cause a resynchronization amongst the stream components. Such may be the case where the stream switched from one component source to another component source resulting in a changed timestamp.

The media ingestion service 110 can synchronize the multiple stream components to one of the components. As used herein, the primary stream component serves as the timing reference to which the other, secondary stream components are synchronized. For example, if the stream includes both audio and video components, the media ingestion service 110 can treat the video component as the primary component and the audio component as the secondary component thereby synchronizing the audio to the video.

The following table provides sample data to illustrate the above exemplary operations. In this example, video is the primary ("Pri.") component and audio is the secondary ("Sec.") component. To simplify this example, the sample data represents audio and video frames with ~33 ms durations. In practice, the two components can have different frame durations and/or time scales (e.g., sequential video frame timestamps are 33 ticks apart while sequential audio timestamps are 50 ticks apart where video and audio ticks corresponds to one ms; sequential video frame timestamps are 33 ticks apart where one video tick is one ms and sequential audio frame timestamps are 10 ticks apart where one audio tick is 100 ms).

| Pri. Frame No. | Pri. Frame TS | Expected Pri. TS | Offset | Offset Update | Sec. Frame No. | Sec. Frame TS | Adjusted Frame TS | Expected Sec. TS |
|---|---|---|---|---|---|---|---|---|
| 1 | 1000 | 0 | −1000 | Y | 1 | 1000 | 0 | 0 |
| 2 | 1032 | 33 | −999 | N | 2 | 1020 | 20 | 33 |
| 3 | 1033 | 67 | −966 | N | 3 | 1066 | 67 | 67 |
| 4 | 1099 | 100 | −999 | N | 4 | 1100 | 100 | 100 |
| 5 | 9000 | 133 | −8867 | Y | 5 | 1133 | −7734 | 133 |
| 6 | 9033 | 167 | −8866 | N | 6 | 9000 | 133 | 167 |
| 7 | 9066 | 200 | −8866 | N | 7 | 9033 | 166 | 200 |
| . | . | . | . | . | . | . | . | . |
| . | . | . | . | . | . | . | . | . |
| . | . | . | . | . | . | . | . | . |

As shown, video frames one through seven have associated timestamps in the column labeled "Pri. Frame TS". The expected timestamp represents the expected timestamp of the next frame given the advertised frame rate which can be used to derive the expected duration of a frame or vice versa (e.g., 33 ms expected frame durations correspond to a 30 fps frame rate). In this example, the expected timestamp is initially adjusted to zero with an offset based on the first frame's timestamp listed under the "Offset" column. Such an offset can be used to transform streamed media data that switches between different sources having different timing to a common timeline (e.g., to handle abrupt changes in timestamps). The offset is updated and sent to the audio pipeline of the media ingestion service 110 when it changes by some threshold amount (e.g., 60 ms) as indicated in the "Offset Update" column Here, between primary frames four and five, the timestamps change by more than the threshold. The offset is updated from −1000 to −8867 for both pipelines.

Irregular timing information can cause the video pipeline of the media ingestion service 110 to duplicate or skip video frames resulting in undesirable video artifacts. For example, the video pipeline can sequentially process frames that match the expected timestamp within some tolerance such as 10 ms of expected. Here, the first, second, and fourth video frames are within that tolerance, but the third frame is not. As a result, the video pipeline may duplicate the second frame or insert a blank frame while discarding the third frame as indicated by the strikethrough.

Irregular timing information can also cause the audio pipeline of the media ingestion service 110 to skip audio frames resulting in undesirable audio artifacts. For example, the audio pipeline can sequentially process frames that match the expected timestamp within some tolerance such as 10 ms of expected. Here, the first, third, and fourth audio frames are within that tolerance, but the second frame is not. As a result, the audio pipeline may insert a period of silence or duplicate another frame while discarding the second frame.

Beyond irregularities in the audio timestamps, synchronizing the audio to the video can also cause undesirable audio artifacts due to offset changes. For example, when the offset changes between video frames four and five, the offset for the audio pipeline is updated. Note that the offset is applied to the value in the column labeled "Sec. Frame TS" to calculate the "Adjusted Frame TS." The audio pipeline applies the new offset to find the next audio frame having an expected timestamp of 133. In this case, the new offset causes the audio pipeline to match frame number six instead of five as the next frame in the sequence. As a result, the audio pipeline skips frame five which can result in an undesirable artifact.

Figure 2:
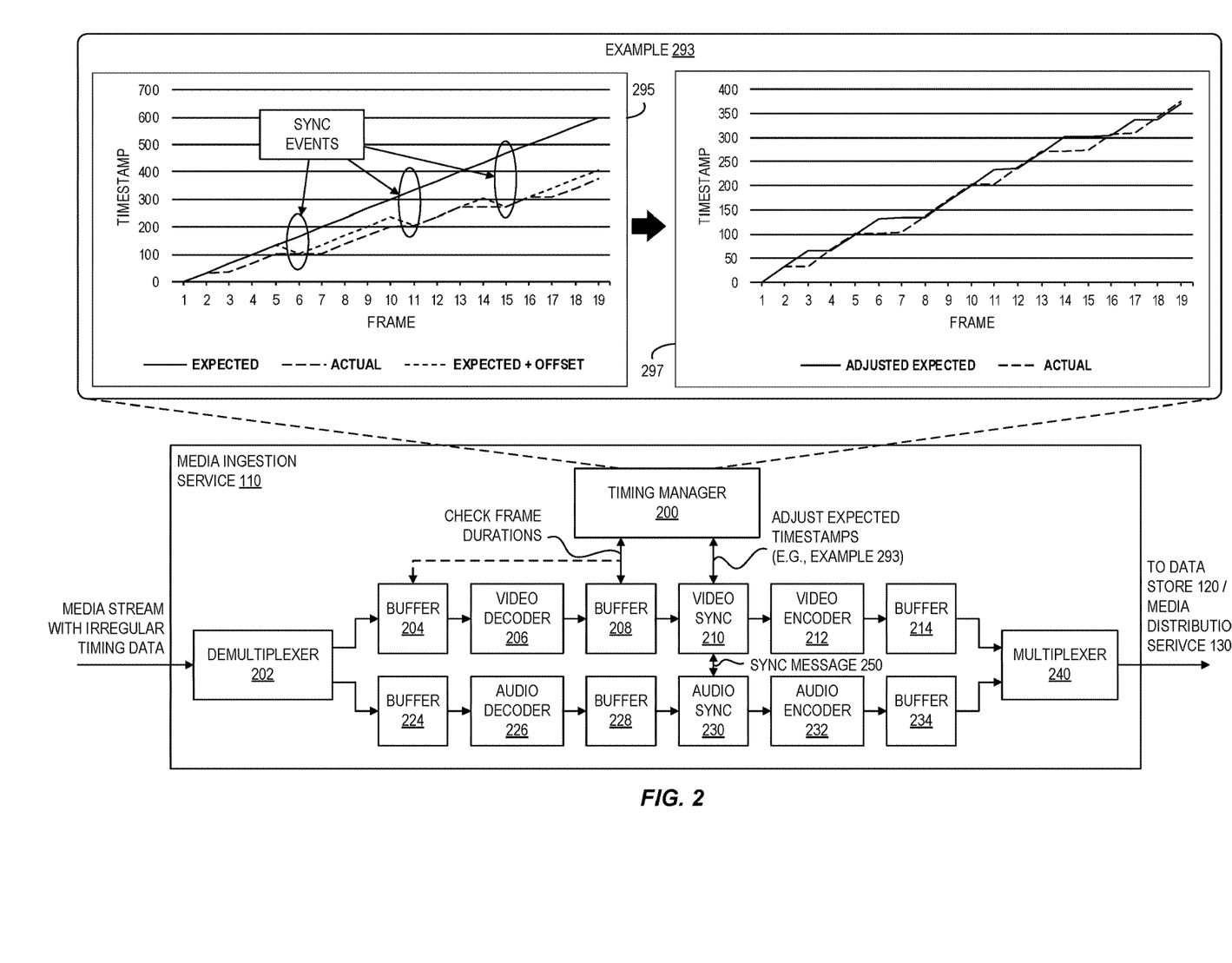
FIG. 2 is a block diagram illustrating an exemplary streaming media processing system implementing a first approach for accommodating irregular timing information in streamed media data according to some embodiments.
Figure 3:
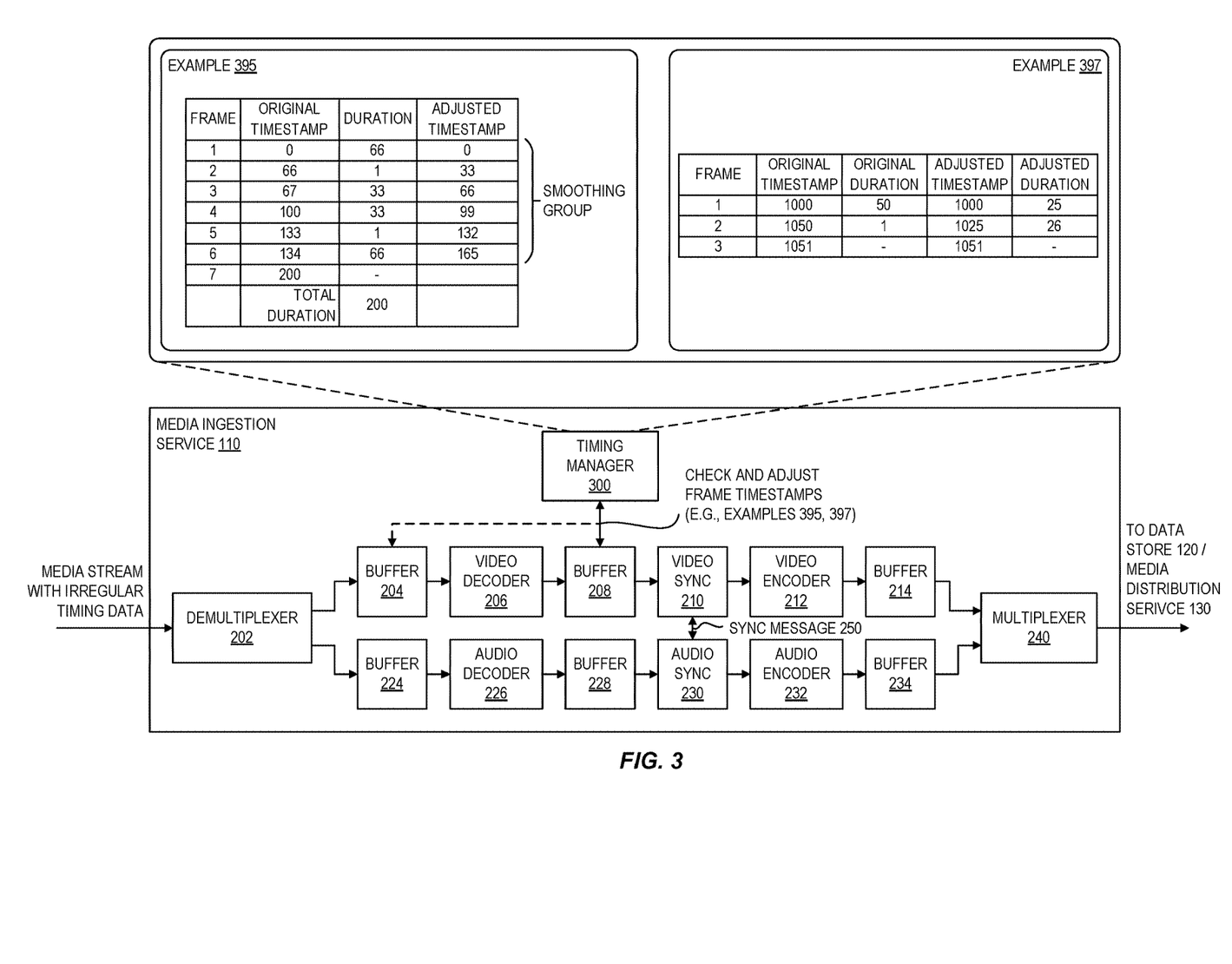
FIG. 3 is a block diagram illustrating an exemplary streaming media processing system implementing a second approach for accommodating irregular timing information in streamed media data according to some embodiments.
Figure 4:
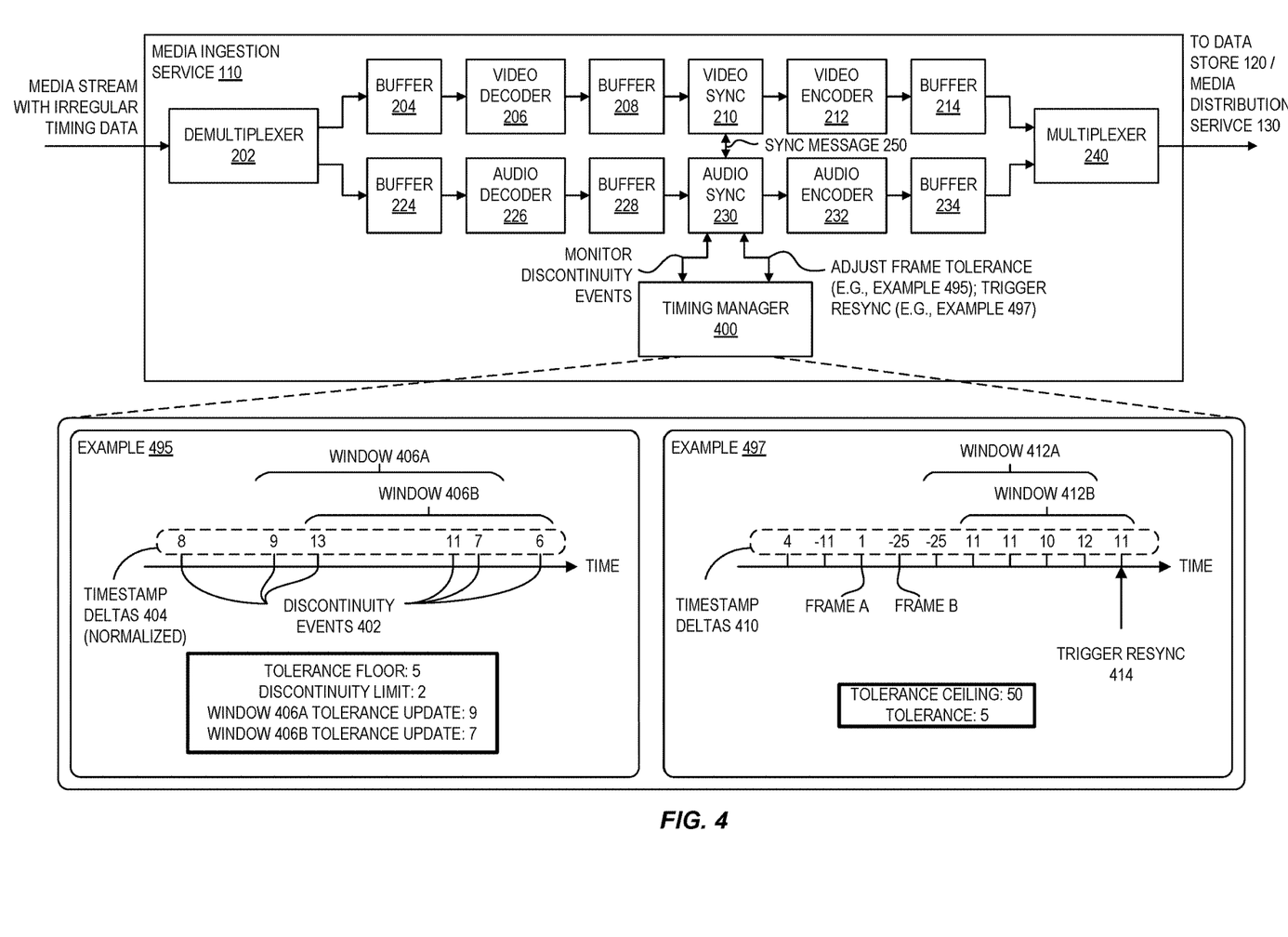
FIG. 4 is a block diagram illustrating an exemplary streaming media processing system implementing a third approach for accommodating irregular timing information in streamed media data according to some embodiments.

FIGS. 2-4 present several approaches that can be used to accommodate irregular timing information in streamed media data to reduce the occurrence of undesirable video and audio artifacts such as that result from the operations described above. With reference to FIG. 2, a timing manager 200 can adjust expected timestamps based on duration information received with the stream. With reference to FIG. 3, a timing manager 300 can adjust the timestamps of frames received with the stream. With reference to FIG. 4, a timing manager 400 can adjust how far out of sync a secondary component of the media stream can be relative to the primary component. In various embodiment, a user may enable and/or disable one or more of these approaches and configure associated parameters via the interface(s) 160.

FIG. 2 is a block diagram illustrating an exemplary streaming media processing system implementing a first approach for accommodating irregular timing information in streamed media data according to some embodiments. In particular, FIG. 2 depicts an exemplary implementation of the media ingestion service 110 that receives a media stream with irregular timing data and outputs another media stream for storage by the data store 120 or streaming by the media distribution service 130. As illustrated, the media ingestion service 110 includes a demultiplexer 202, a video decoder 206, a video sync stage 210, a video encoder 212, an audio decoder 226, an audio sync stage 230, an audio encoder 232, and a multiplexer 240. Together, the video decoder 206, the video sync stage 210, and the video encoder 212 can be considered a video pipeline, and the audio decoder 226, the audio sync stage 230, and the audio encoder 232 can be considered an audio pipeline. The various pipeline stages can be interconnected via buffers 204, 208, 214, 224, 228, 234 as illustrated, which may be implemented using a single memory device or multiple memory devices.

In this example, the media ingestion service 110 receives streamed media data and transcodes it for subsequent distribution. The media ingestion service 110 can change the streaming format (e.g., from a TCP-based RTMP stream to an HTTP-based HLS stream) and/or the video and/or audio formats (e.g., from one level of compression to another level of the same type of compression; between compression formats, etc.). The demultiplexer 202 separates the components of a received media stream (e.g., audio, video) for processing by the video pipeline and the audio pipeline. For example, the demultiplexer 202 can extract video frames and associated metadata, including timing information, from a RTMP media stream and store that data in the buffer 204. Similarly, the demultiplexer 202 can extract audio frames and associated metadata, including timing information, from the RTMP media stream and store that data in the buffer 224.

The multiplexer 240 combines the components of the processed media stream processed by the video pipeline and the audio pipeline. For example, the multiplexer 240 can combine the processed video and audio portions into another RTMP stream or one or more files for segmented delivery via an HTTP-based streaming format such as HLS or DASH.

The video decoder 206 and the audio decoder 226 respectively process the video and audio portions of the received media stream. For example, they can decompress the video and audio portions into an uncompressed format. The video encoder 212 and the audio encoder 232 respectively process the uncompressed video and audio portions of the media stream. For example, they can compress the video and audio portions into a compressed format.

The video sync stage 210 and the audio sync stage 230 attempt to ensure that the data processed by the video encoder 212 and the audio encoder 232, respectively, match the timing information provided by the stream and that the video and audio remain in sync. When the advertised rate of video and/or audio data diverges from actual frame timestamps, frames may be dropped or offset updates between the primary and secondary component(s) can cause undesirable artifacts, such as those described for video and audio with reference to the above table. For example, when the advertised—or expected—timing of frames (e.g., 30 fps) diverges from actual frame timestamps, the media ingestion service 110 may drop frames. As another example, if the video is the primary component, the video sync stage 210 can advertise timing changes (e.g., a new offset) to the audio sync stage 230 as indicated by sync message 250.

To illustrate the first approach for accommodating irregular timing information in streamed media data, an example 293 includes plots 295 and 297. In example 293, assume a media stream has an advertise frame rate of 30 fps, the threshold for offset adjustment is 60 ms, and of the 19 frames, the durations of frames 2, 5, 6, 10, 13, 14 and 16 are approximately 1 ms while the durations of the remaining frames (excluding frame 19 because the timestamp of frame 20 is not known at this time) are approximately 33 ms. For example, the plateau between frames 2-3 on the dashed, actual line indicates that frame 3 had a timestamp approximately 1 ms after the timestamp of frame 2.

In plot 295, the solid line indicates the expected timestamp of incoming frames based on the expected frame duration given an advertised frame rate, the dashed line indicates the actual timing of incoming frames (based on the delta between the timestamp of a frame and the timestamp of the next frame), and the dotted line indicates how the expected timestamp is adjusted using an updated offset when the different between the expected timing and actual timing exceeds the example offset threshold of 60 ms. Since each shortened frame is approximately 32 ms off expected and the threshold for an offset adjustment is 60 ms, every two short frames results in a synchronization event. These synchronization events can cause undesirable playback artifacts such as the duplication or dropping of frames as described herein.

To reduce or avoid synchronization events due to irregular frame timing data, the timing manager 200 adjusts the expected frame times based on frame durations as calculated from frame timestamps, deviating from the advertised frame rate of the media stream. The timing manager 200 reads a buffer (e.g., buffer 204 or 208) prior to the video sync stage 210 to determine actual frame durations. Each time a frame with a shorter than expected duration is processed, the timing manager 200 adjusts the next expected frame time downward to prevent the expected frame times from running away relative to the actual frame times. This can be illustrated in plot 297 where the solid line indicates the adjusted expected timestamp of incoming frames and the dashed line indicates the actual timing of incoming frames. By adjusting the expected timestamps, the timing manager 200 can cause the difference between expected frame times and the actual frame times to accumulate at a lower rate resulting in fewer synchronization events and associated undesirable artifacts in playback. Note that in the case of long frames (e.g., frames with a duration longer than expected based on the advertised frame rate), the timing manager 200 can take no action to prevent advancing the expected frame times beyond the advertised frame rate. Instead, long frames can be handled by other components of the media ingestion service 110 such as by inserting duplicate frames.

FIG. 3 is a block diagram illustrating an exemplary streaming media processing system implementing a second approach for accommodating irregular timing information in streamed media data according to some embodiments. In particular, FIG. 3 depicts an exemplary implementation of the media ingestion service 110 that receives a media stream with irregular timing data and outputs another media stream for storage by the data store 120 or streaming by the media distribution service 130. The above description of the demultiplexer 202, the video and audio pipelines, and the multiplexer 240 with reference to FIG. 2 applies equally to the similarly numbered components of FIG. 3.

To reduce or avoid synchronization events due to irregular frame timing data, the timing manager 300 adjusts frame timestamps to lengthen the durations of shorter frames and shorten the durations of longer frames relative to the advertised or expected frame rate, deviating from at least some of the timing data of the media stream. Two techniques for such adjustment are illustrated in examples 395 and 397. In example 395, a sequence of six frames with a total duration of 200 ms is shown where the duration of each frame is the difference between the timestamp of the frame and the timestamp of the next frame. Assuming a video component of a media stream was advertised to have a 30 fps frame rate, frames two and five have short durations, frames one and six have long durations, and frames three and four have durations in line with the advertised frame rate. The timing manager 300 can inspect frame timestamps over a window of two or more frames with a step size based on the window size. Based on the total duration, the timing manager 300 can adjust the timestamps of the frames within the window. In example 395, the timing manager 300 adjusts the timestamps of the six frames based on the total duration of the frames over the window.

In example 397, the timing manager 300 matches one or more patterns of frames that can be set based on empirical evidence of irregularities in timing information in streamed media data. In a simple case, the timing manager 300 matches a long frame followed by a short frame and advances the timestamp of the short frame to decrease the duration of the long frame. For example, the timing manager 300 can match a frame having a duration above some threshold of the expected duration (e.g., 10 ms above 33 ms) followed by a frame having a duration below some threshold of the expected duration (e.g., 10 ms below 33 ms). In example 397, frame one has a duration of 50 ms and frame two has a duration of 1 ms, so the timing manager advances the timestamp of frame two—the short frame—by approximately half the total duration of the two frames. In another simple case, the timing manager 300 matches a short frame followed by a long frame and defers the timestamp of the long frame to increase the duration of the short frame.

Whether using the technique illustrated by example 395, example 397, or some other technique to adjust frame timestamps, the timing manager 300 regularizes frame timestamps. By doing so, the timing manager 300 increases the likelihood that frames having timestamps that deviate from an expected timestamp will be within a tolerance around that expected tolerance, thereby reducing the likelihood of frame skips/repeats.

FIG. 4 is a block diagram illustrating an exemplary streaming media processing system implementing a third approach for accommodating irregular timing information in streamed media data according to some embodiments. In particular, FIG. 4 depicts an exemplary implementation of the media ingestion service 110 that receives a media stream with irregular timing data and outputs another media stream for storage by the data store 120 or streaming by the media distribution service 130. The above description of the demultiplexer 202, the video and audio pipelines, and the multiplexer 240 with reference to FIG. 2 applies equally to the similarly numbered components of FIG. 4.

To reduce or avoid re-synchronizing a secondary stream component with a primary stream component, the timing manager 400 adjusts how far out of sync the secondary stream component can be from the primary stream component before re-resynchronization of the secondary component to the primary component. Two techniques for such adjustment are illustrated in examples 495 and 497. In example 495, the timing manager 400 adjusts a tolerance between the expected secondary component frame timestamps. Such a tolerance may be used to identify the next frame in the secondary component frame sequence based on the secondary component frame rate and offset determined during processing of the primary component (e.g., the offset advertised from video sync to audio sync via sync message 250). For example, if the next expected audio timestamp is 10080 ms as adjusted by the advertised offset and the tolerance is 5 ms, the audio sync stage 230 will process the audio frame having a timestamp of 10080+/−5 ms. If no audio frame within that range is available, processing of audio frames can experience a discontinuity resulting in undesirable audio artifacts. As a result, irregular frame timestamps of the secondary component can lead to frequent discontinuities.

To avoid frequent discontinuities, the timing manager 400 can monitor the number of discontinuity events 402 within a window 406 and, based on a discontinuity limit, adjust the tolerance up or down. To illustrate, window 406A covers four discontinuity events 402 where the timestamp deltas 404 (e.g., the difference between the expected timestamp and the nearest timestamp) were 9, 13, 11, and 7 ms. If the discontinuity limit for that period of time is two, the timing manager 400 adjusts the tolerance to 9 ms so that moving forward, audio frame timestamps that are +/−9 ms of the next expected audio timestamp will not cause a discontinuity. Later in time at window 406B, the window covers four discontinuity events 402 where the timestamp deltas 404 were 13, 11, 7, and 6 ms. Using the same discontinuity limit, the timing manager 400 adjusts the tolerance to 7 ms so that audio frame timestamps that are +/−7 ms of the next expected audio timestamp will not cause a discontinuity. In some embodiments, the timing manager 400 can decrease the tolerance to a tolerance floor such as +/−5 ms.

In example 497, the audio sync stage 230 defers resynchronizing the audio (e.g., the secondary component) to the video (e.g., the primary component) until the timestamp deltas 410 within a window 412 have stabilized. In other words, rather than introducing a discontinuity immediately when no audio frame is available with a timestamp within the tolerance (e.g., 5 ms) of the next expected audio timestamp, the audio sync stage 230 processes the next available frame with a timestamp closest to the next expected timestamp. The audio sync stage 230 continues to process the next available audio frames until the timestamp deltas 410 reach a level of stability. For example, the audio sync stage 230 would process the frame marked A having a timestamp delta of '1' (less than the tolerance) and then process the frame marked B having a timestamp delta of '−25' even though it is greater than the tolerance. In some embodiments, if no frame is within a tolerance ceiling (e.g., 50 ms), the audio sync stage 230 immediately resynchronizes the audio to the video.

In particular, the timing manager 400 can monitor the stability of the differences between the expected frame timestamps and the nearest frame timestamps. For example, the timing manager 400 can monitor the variation amongst the timestamp deltas 410 within a window (e.g., the N most recent N frames). If the stability of the timestamp deltas within that window is within a limit, the timing manager 400 can trigger resynchronization of the secondary media component to the primary media component (e.g., by triggering resynchronization with the audio sync stage 230). To illustrate, window 412A covers five frames with timestamp deltas 410 (e.g., the difference between the expected timestamp and the nearest timestamp) of −25, 11, 11, 10, and 12 ms, and window 412B covers five frames with timestamp deltas 410 of 11, 11, 10, 12, and 11 ms. When that variation is within some allotted range but outside of the tolerance, the timing manager 400 triggers resynchronization. Such a variation may be measured in various ways, such as based on a variance or standard deviation around a mean of the timestamp deltas 410 or based on each of the timestamp deltas 410 being offset from zero but within some tolerance. For example, the timing manager 400 can trigger resynchronization at time 414 based on the deltas 410 within window 412B and not the deltas 410 within window 412A due to the higher variation in window 412A. As another example, the timing manager 400 can trigger resynchronization at time 414 based on the deltas 410 within window 412B since each of the events is within the example tolerance of 5 ms but with reference to a new mean (e.g., +11 given the timestamp deltas within window 412B). By deferring resynchronizations, the audio sync stage 230 introduces fewer discontinuities by resynchronizing either when there is a large timestamp delta 410 (e.g., greater than the tolerance ceiling) or when the timestamp deltas 410 have stabilized.

Figure 5:
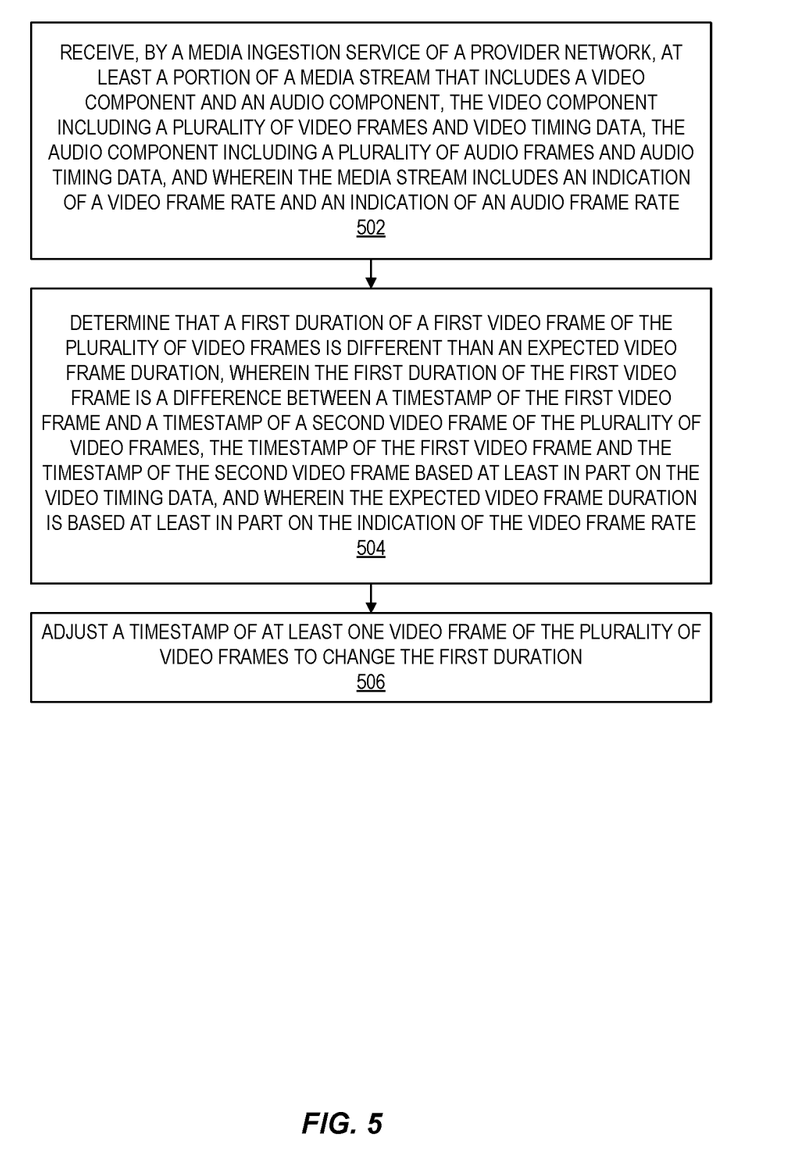
FIG. 5 is a flow diagram illustrating operations of a method for accommodating irregular timing information in streamed media data according to some embodiments.

FIG. 5 is a flow diagram illustrating operations of a method for accommodating irregular timing information in streamed media data according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the media ingestion service 110 of the other figures.

The operations include, at block 502, receiving, by a media ingestion service of a provider network, at least a portion of a media stream that includes a video component and an audio component, the video component including a plurality of video frames and video timing data, the audio component including a plurality of audio frames and audio timing data, and wherein the media stream includes an indication of a video frame rate and an indication of an audio frame rate. For example, the media ingestion service 110 of the other figures can receive and process a multimedia stream. The multimedia stream can include various media components such as video and audio. In addition, the multimedia stream can provide indications of expected video and audio frame rates as well as frame-specific timing information (e.g., timestamps, sequences and durations, etc.).

The operations further include, at block 504, determining that a first duration of a first video frame of the plurality of video frames is different than an expected video frame duration, wherein the first duration of the first video frame is a difference between a timestamp of the first video frame and a timestamp of a second video frame of the plurality of video frames, the timestamp of the first video frame and the timestamp of the second video frame based at least in part on the video timing data, and wherein the expected video frame duration is based at least in part on the indication of the video frame rate. Occasionally, the transmitter of the media stream may transmit timing data that is inconsistent with the advertised frame rates. To detect this, the media ingestion service can compare the durations of individual frames compared to an expected duration given the advertised frame rate. In some cases, the durations of individual frames can be calculated from timestamps of adjacent frames.

The operations further include, at block 506, adjusting a timestamp of at least one video frame of the plurality of video frames to change the first duration. One of the many approaches to accommodating irregular timing information in streamed media data involves changing the received timing data associated with individual media frames to better match the advertised frame rate. Examples of such an approach are provided with reference to FIG. 3.

Figure 6:
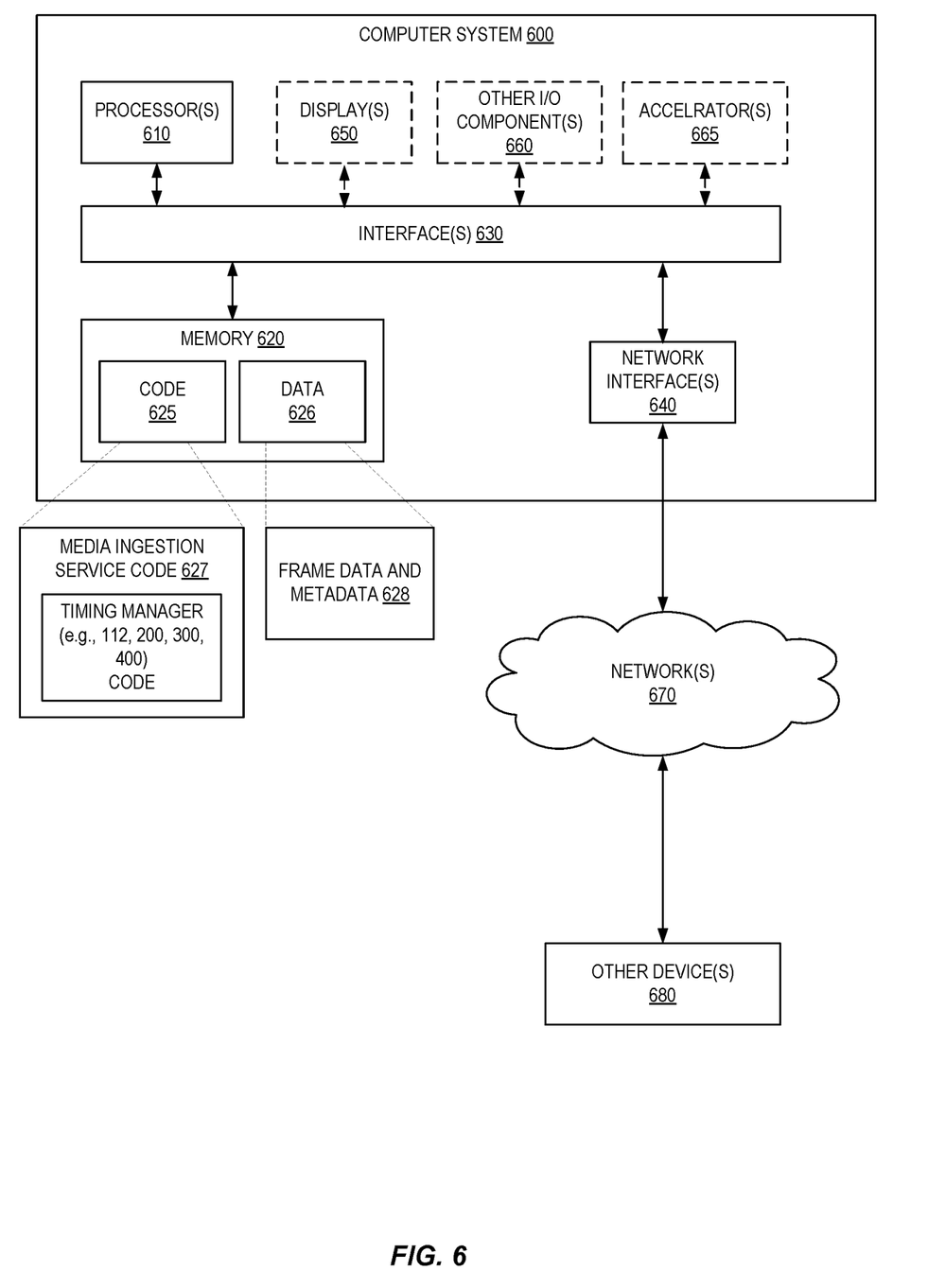
FIG. 6 is a block diagram illustrating an example computer system that may be used in some embodiments.

FIG. 6 is a block diagram illustrating an example computer system that may be used in some embodiments, such as computer systems 105, 140, 150, or computer system(s) used to implement the components of the provider network 100. Exemplary computer system 600 includes one or more processors 610 coupled to a memory 620 via an interface 630. Computer system 600 further includes a network interface 640 coupled to the interface 630. Computer system 600 optionally includes one or more displays 650, one or more other input/output (I/O) components 660, and/or one or more accelerators 665. While FIG. 6 shows computer system 600 as a single computing device, in various embodiments a computer system 600 may include one computing device or any number of computing devices configured to work together as a single computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 610 may commonly, but not necessarily, implement the same ISA.

The memory 620 may store instructions and data accessible by processor(s) 610. In various embodiments, the memory 620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within the memory 620 as code 625 and data 626. For example, the code 625 can include media ingestion service code 627 for one or more of the components of the media ingestion service 112, such as code for the demultiplexer 202, the video decoder 206, the audio decoder 226, the video sync stage 210, the audio sync stage 230, a timing manager implementing one or more of the approaches described herein (e.g., the timing manager 112, 200, 300, 400), the video encoder 212, the audio encoder 232, the multiplexer 240, and/or the buffers 204, 224, 208, 228, 214, and 234 (e.g., interface code used to store data to and retrieve data from physical memory devices). The data 626 can include frame data and metadata 628, such as the stream metadata 180, the frame timestamp metadata 190, and frame data (in compressed and/or uncompressed form). Note that in some embodiments, the components of the media ingestion service 112 may be implemented by a plurality of networked computer systems such that one computer system performs a portion of the media ingestion service 112 (e.g., receiving and decoding a stream, implementing approaches for accommodating irregular timing information) while another computer system performs another portion of the media ingestion service (e.g., encoding a stream).

In one embodiment, the interface 630 may be configured to coordinate I/O traffic between processor 610, memory 620, and any peripheral devices in the device, including network interface 640 or other peripheral interfaces. In some embodiments, the interface 630 may perform any necessary protocol, timing or other data transformations to convert data signals from one component (e.g., memory 620) into a format suitable for use by another component (e.g., processor 610). In some embodiments, the interface 630 may include support for devices attached through various types of peripheral buses, such as a variant of the Peripheral Component Interconnect (PCI) bus standard or the Universal Serial Bus (USB) standard, for example. In some embodiments, the function of the interface 630 may be split into two or more separate components, such as a north bridge and a south bridge, for example. Also, in some embodiments some or all of the functionality of the interface 630, such as an interface to memory 620, may be incorporated directly into processor 610.

Network interface 640 may be configured to allow data to be exchanged between computer system 600 and other devices 680 attached to a network or networks 670, such as other computer systems or electronic devices as illustrated in the other figures, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks (SANs) such as Fibre Channel SANs, or via I/O any other suitable type of network and/or protocol.

In some embodiments, memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 600 via the interface 630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 600 as memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

The display(s) 650, such as a touch screen or liquid crystal display (LCD), convey visual information to a user, although some computer systems may not have a display at all (e.g., servers). The I/O components 660 provide facilities to the user for interacting with the computer system 600. Such I/O components 660 include, but are not limited to, speakers for rendering audio, keyboards, mice, or other input devices for receiving user inputs, microphones, cameras, other sensors, etc. for collecting data, etc. The accelerators 665 may provide hardware acceleration for media encode or decode operations.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 140A-140N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving at least a portion of a media stream that includes a video component and an audio component, the video component including a plurality of video frames and video timing data, the audio component including a plurality of audio frames and audio timing data, and wherein the media stream includes an indication of a video frame rate and further includes an indication of an audio frame rate;
   tracking a number of times a difference between each of a plurality of audio timestamps of the plurality of audio frames and an associated expected audio timestamp exceeded a tolerance;
   increasing the tolerance when the number of times exceeds a maximum number of resynchronization events between the audio component and the video component over a period of time;
   determining that a first duration of a first video frame of the plurality of video frames is different than an expected video frame duration, wherein the expected video frame duration is based at least in part on the indication of the video frame rate; and
   adjusting a timestamp of at least one video frame of the plurality of video frames to change the first duration.

2. The computer-implemented method of claim 1, further comprising:
   incrementing an expected video timestamp by the first duration;
   using the expected video timestamp to identify a subsequent video frame of the plurality of video frames; and
   processing the subsequent video frame.

3. The computer-implemented method of claim 1, further comprising:
   tracking a variation parameter indicating a difference between each of a plurality of audio timestamps of the plurality of audio frames and an associated expected audio timestamp, wherein the associated expected audio timestamp for each of the plurality of audio timestamps is based at least in part on the indication of the audio frame rate; and
   resynchronizing the audio component to the video component when the variation parameter is within a range.

4. The computer-implemented method of claim 1, further comprising decreasing the tolerance when the number of times falls below a maximum number of resynchronization events between the audio component and the video component over a period of time.

5. The computer-implemented method of claim 1:
   wherein the at least one video frame is part of a group of video frames that match a pattern of frame durations; and
   wherein a second duration of a second video frame of the group of video frames is greater than the expected video frame duration.

6. The computer-implemented method of claim 1:
   wherein the at least one video frame is part of a group of video frames; and
   the method further comprising adjusting each timestamp associated with a video frame of the group of video frames based at least in part on a total duration of the group of video frames.

7. The computer-implemented method of claim 1, wherein the adjusted timestamp is stored in a buffer upstream of a video encoder of a media ingestion service of a provider network.

8. The computer-implemented method of claim 1, wherein the adjusting the timestamp of the at least one video frame is contingent on receipt of a message that enables timestamp adjustment.

9. A system comprising:
   a media distribution service implemented by a first one or more electronic devices of a provider network; and a media ingestion service implemented by a second one or more electronic devices of the provider network, the media ingestion service including instructions that upon execution cause the media ingestion service to:
  receive at least a portion of a media stream that includes a video component and an audio component, the video component including a plurality of video frames and video timing data, the audio component including a plurality of audio frames and audio timing data, and wherein the media stream includes an indication of a video frame rate and an indication of an audio frame rate;
  track a number of times a difference between each of a plurality of audio timestamps of the plurality of audio frames and an associated expected audio timestamp exceeded a tolerance;
  increase the tolerance when the number of times exceeds a maximum number of resynchronization events between the audio component and the video component over a period of time;
  determine that a first duration of a first video frame of the plurality of video frames is different than an expected video frame duration, wherein the expected video frame duration is based at least in part on the indication of the video frame rate;
  adjust a timestamp of at least one video frame of the plurality of video frames to change the first duration;
  encode the at least one video frame to generate one or more encoded video frames in a compressed format; and
  send the one or more encoded video frames to the media distribution service.

10. The system of claim 9, wherein the media ingestion service includes further instructions that upon execution cause the media ingestion service to:
  increment an expected video timestamp by the first duration;
  use the expected video timestamp to identify a subsequent video frame of the plurality of video frames; and
  process the subsequent video frame.

11. The system of claim 9 wherein the media ingestion service includes further instructions that upon execution cause the media ingestion service to:
  track a variation parameter indicating a difference between each of a plurality of audio timestamps of the plurality of audio frames and an associated expected audio timestamp, wherein the associated expected audio timestamp for each of the plurality of audio timestamps is based at least in part on the indication of the audio frame rate; and
  resynchronize the audio component to the video component when the variation parameter is within a range.

12. The system of claim 9, wherein the media ingestion service includes further instructions that upon execution cause the media ingestion service to decrease the tolerance when the number of times falls below a maximum number of resynchronization events between the audio component and the video component over a period of time.

13. The system of claim 9:
  wherein the at least one video frame is part of a group of video frames that match a pattern of frame durations; and
  wherein a second duration of a second video frame of the group of video frames is greater than the expected video frame duration.

14. The system of claim 9:
  wherein the at least one video frame is part of a group of video frames; and
  wherein the media ingestion service includes further instructions that upon execution cause the media ingestion service to adjust each timestamp associated with a video frame of the group of video frames based at least in part on a total duration of the group of video frames.

15. The system of claim 9, wherein the adjustment of the timestamp of the at least one video frame is contingent on receipt of a message that enables timestamp adjustment by the media ingestion service.

16. One or more non-transitory computer readable storage media having instructions which, when executed by one or more processors of one or more computing devices, cause the one or more computing devices to perform operations comprising:
  receiving at least a portion of a media stream that includes a video component and an audio component, the video component including a plurality of video frames and video timing data, the audio component including a plurality of audio frames and audio timing data, and wherein the media stream includes an indication of a video frame rate and further includes an indication of an audio frame rate;
  tracking a number of times a difference between each of a plurality of audio timestamps of the plurality of audio frames and an associated expected audio timestamp exceeded a tolerance;
  increasing the tolerance when the number of times exceeds a maximum number of resynchronization events between the audio component and the video component over a period of time;
  determining that a first duration of a first video frame of the plurality of video frames is different than an expected video frame duration, wherein the expected video frame duration is based at least in part on the indication of the video frame rate; and
  adjusting a timestamp of at least one video frame of the plurality of video frames to change the first duration.

17. The one or more non-transitory computer readable storage media of claim 16, further having instructions which, when executed by the one or more processors of the one or more computing devices, cause the one or more computing devices to perform operations comprising:
  incrementing an expected video timestamp by the first duration;
  using the expected video timestamp to identify a subsequent video frame of the plurality of video frames; and
  processing the subsequent video frame.

18. The one or more non-transitory computer readable storage media of claim 16, further having instructions which, when executed by the one or more processors of the one or more computing devices, cause the one or more computing devices to perform operations comprising:
  decreasing the tolerance when the number of times falls below a maximum number of resynchronization events between the audio component and the video component over a period of time.

19. The one or more non-transitory computer readable storage media of claim 16:
  wherein the at least one video frame is part of a group of video frames that match a pattern of frame durations; and
  wherein a second duration of a second video frame of the group of video frames is greater than the expected video frame duration.

20. The one or more non-transitory computer readable storage media of claim 16, further having instructions which, when executed by the one or more processors of the one or more computing devices, cause the one or more computing devices to perform operations comprising:
    adjusting each timestamp associated with a video frame of a group of video frames based at least in part on a total duration of a group of video frames, wherein the at least one video frame is part of the group of video frames.

\* \* \* \* \*